(12) United States Patent
Proulx et al.

(10) Patent No.: US 7,856,599 B2
(45) Date of Patent: Dec. 21, 2010

(54) METHOD AND SYSTEM FOR IP LINK MANAGEMENT

(75) Inventors: Denis Proulx, Kanata (CA); Chuong Ngoc Ngo, Ottawa (CA); Attaullah Zabihi, Ottawa (CA); David Wing-Chung Chan, Nepean (CA); Felix Katz, Ottawa (CA)

(73) Assignee: Alcatel-Lucent Canada Inc., Kanata, ON (CA)

( * ) Notice: Subject to any disclaimer, the term of this patent is extended or adjusted under 35 U.S.C. 154(b) by 894 days.

(21) Appl. No.: 10/027,821

(22) Filed: Dec. 19, 2001

(65) Prior Publication Data

US 2003/0137532 A1 Jul. 24, 2003

(51) Int. Cl.
*G06F 15/177* (2006.01)
(52) U.S. Cl. .................. 715/737; 715/733; 715/734; 715/735; 715/736; 715/738; 715/739
(58) Field of Classification Search ............. 345/734, 345/735, 736; 715/733–737, 739
See application file for complete search history.

(56) References Cited

U.S. PATENT DOCUMENTS

| | | |
|---|---|---|
| 5,175,800 A | 12/1992 | Galis et al. |
| 5,491,796 A | 2/1996 | Wanderer et al. |
| 5,500,934 A | 3/1996 | Austin et al. |
| 5,550,816 A * | 8/1996 | Hardwick et al. ........... 370/397 |
| 5,835,720 A | 11/1998 | Nelson et al. |
| 5,838,907 A * | 11/1998 | Hansen ........................ 709/220 |
| 5,872,928 A | 2/1999 | Lewis et al. |
| 6,061,505 A | 5/2000 | Pitchaikani et al. |
| 6,292,472 B1 | 9/2001 | Rariden et al. |
| 6,377,987 B1 | 4/2002 | Kracht |
| 6,381,237 B1 * | 4/2002 | Lam et al. ................... 370/351 |

(Continued)

FOREIGN PATENT DOCUMENTS

EP 0 455 402 A2 6/1991

(Continued)

OTHER PUBLICATIONS

Dupuy et al.; Netmate: A Network Management Environment; article; Mar. 1991, IEEE Network Magazine; pp. 35-43; Mar. 5, 1991, No. 2, New York, US.

*Primary Examiner*—Simon Ke
(74) *Attorney, Agent, or Firm*—Ross D. Snyder & Associates, Inc.

(57) ABSTRACT

An embodiment of the present invention provides a method for network management that allows the configuration of IP links in one step, via a GUI form, even though the management protocols available at the two end links (routers) may differ. According to one embodiment, the method comprises gathering information from the user, validating this information, and then sending this information to the appropriate router(s). According to one embodiment, the method enables a user to specify various configurations when provisioning an IP link, for example, the type of IP link (Point-to-Point, Point-to-IP, or Point-to-Subnet), the numbering type (Numbered or Unnumbered), the application type (MPLS and/or IP Forwarding), and the sub-layer interfaces to be used (Packet Over Sonet, Asynchronous Transfer Mode, GigEthernet, and others). In addition, according to one embodiment, the method allows the IP link to be associated to existing router interface(s), or the interfaces can be created as part of the IP link creation process.

15 Claims, 8 Drawing Sheets

U.S. PATENT DOCUMENTS

| | | |
|---|---|---|
| 6,516,345 B1 | 2/2003 | Kracht |
| 6,570,867 B1 | 5/2003 | Robinson et al. |
| 6,584,503 B1 | 6/2003 | Carney et al. |
| 6,611,863 B1 | 8/2003 | Banginwar |
| 6,772,204 B1 * | 8/2004 | Hansen ....................... 709/220 |
| 6,791,981 B1 | 9/2004 | Novaes |
| 6,891,793 B1 | 5/2005 | Suzuki et al. |
| 6,895,433 B1 | 5/2005 | Slater et al. |
| 6,912,587 B1 | 6/2005 | O'Neil |
| 6,917,626 B1 | 7/2005 | Duvvury |
| 7,136,357 B2 | 11/2006 | Soumiya et al. |
| 2002/0032761 A1 | 3/2002 | Aoyagi et al. |
| 2002/0165978 A1 * | 11/2002 | Chui ......................... 709/238 |
| 2002/0169884 A1 | 11/2002 | Jean et al. |
| 2003/0097438 A1 | 5/2003 | Bearden et al. |
| 2003/0154271 A1 | 8/2003 | Baldwin et al. |

FOREIGN PATENT DOCUMENTS

| | | |
|---|---|---|
| EP | 0 772 318 A2 | 7/1997 |
| EP | 0 809 383 A2 | 11/1997 |
| EP | 0 996 253 A2 | 4/2000 |
| EP | 0 996 253 A3 | 4/2000 |
| WO | WO 92/05485 | 4/1992 |
| WO | WO 95/06989 | 3/1995 |

* cited by examiner

METHOD AND SYSTEM FOR IP LINK MANAGEMENT

FIELD OF THE DISCLOSURE

The present invention relates to the field of data communications networks, and more particularly to a method for network management for end-to-end IP link management between network devices via a dedicated graphical user interface.

BACKGROUND

A data communications network transmits data among and between network devices (often referred to as nodes) which are physically and logically connected to the network. The physical configuration of a network changes when network devices are added to or removed from the network, and when physical connections between devices are made or changed. The logical configuration of a network changes as logical connections are established between communicating network devices utilizing the physical structure of the network. Network devices include devices that can send and/or receive data, as well as devices that can forward data. Network devices that can forward data are important in all but the very simplest networks. In most networks, direct connections do not exist between most network devices. Instead, each network device is connected to a limited number of adjacent network devices. For network devices to be able to communicate when they are not physically connected, the two communicating network devices rely on intermediate network devices to forward communications between them.

Data transmitted over data communications networks are generally referred to as packets or frames. Both of these terms relate to the same subject—data to be transmitted. A string of data is fragmented into packets at the sending network device and sent over the network to the receiving network device. The receiving network device assembles the individual packets in the correct order to reconstruct the original data string. The particular manner in which packet fragmentation and transmission occurs from one network layer to another is defined by the various data communication protocols. One prominent data communication protocol is Transmission Control Protocol, or TCP, and another is Internet Protocol, usually referred to simply as IP, or IP protocol. Other examples of data communication protocols are Multi-Protocol Label Switching, or MPLS, Border Gateway Protocol, or BGP, and User Datagram Protocol, or UDP.

Data communications networks can be conceptualized as comprising a hierarchy of communications layers that establish different types of connections between network devices. The Open Systems Interconnect (OSI) Reference Model developed by the International Standards Organization (ISO) is generally used to describe the structure and function of data communications protocols. A layer does not define a single protocol, but rather a data communications function that may be carried out by any number of protocols. Thus, each layer may contain various protocols, each offering a service appropriate to the function of that layer. The more basic functions are provided at the lower layers, while successively more sophisticated functions are provided at successively higher layers. In the OSI model, each lower layer in the model provides data communications capabilities or functions that are utilized by the next higher layer. A schematic illustration of the OSI seven-layer model is shown in FIG. 2. As seen in FIG. 2, the seven layers in the OSI model, beginning from the bottom, are physical layer 205, data link layer 210, network layer 215, transport layer 220, session layer 225, presentation layer 230, and application layer 235. In the OSI model, the IP protocol is commonly considered as being associated with the third layer, network layer 215.

In an IP network, each sending and receiving device is assigned a 32-bit address. The address is usually written as a series of four "octets" (e.g., numbers within a range of 0-255) separated by periods. Examples of IP addresses are 127.0.0.1, 205.160.34.112, 23.1.99.244, etc. Each IP packet sent over an IP network includes the sender's IP address and the recipient's IP address. The recipient's IP address is used to route the packet from the sending network device via intermediate network devices that have IP forwarding capabilities to the recipient network device.

An example of a simple network that illustrates IP forwarding and logical links is shown in FIG. 1. The network of FIG. 1 includes two types of network devices: non-IP-forwarding devices 105, 110, 115 and 120 (represented by rectangles and which may, for example, comprise personal computers or computer workstations), and IP-forwarding devices 125, 130, 135, 140, 145 and 150 (represented by circles and which may, for example, comprise IP routers). The network devices in FIG. 1 are interconnected by a various bi-directional connections or links 160, 162, 164, 166, 168, 170, 172, 174, 176, 178 and 180, represented in FIG. 1 by two-headed arrows.

Links 160-180 may comprise direct physical connections between the adjacent network devices, or may comprise logical connections that involve intermediate devices, but are "seen" by the connected devices as direct connections. For example, network device 110 is connected to network device 130 via link 166. That is, network device 110 knows that if it sends a communication via its interface port connected to link 166, the communication will be received by network device 130. It doesn't matter to network device 110 whether link 166 is a single, physical connection, or a series of physical connections. Logical links such as links 160-180 that connect two network devices are sometimes referred to as "IP links." The term "IP links" as used herein includes logical links that use the IP protocol, as well as logical links utilizing other protocols, e.g., MPLS.

In the network portrayed in FIG. 1, network device 110 is connected directly (via link 166) only to network device 130. For network device 110 to communicate to any other network device, the IP forwarding capabilities of network device 130 must be used. In addition to network device 110, to which it is connected via link 166, network device 130 has direct connections to three other network devices 125, 135, and 145, via respective links 160, 168, and 176. Typically, each of links 160, 166, 168 and 176 are connected to separate ports on network device 130. Each port may be a separate physical interface, or two or more ports may share a single, physical interface. Each port may have its own unique assigned IP address, in which case network device 130, as well as each of its ports, may have distinct IP addresses.

Network device 130 of FIG. 1 has been defined to have IP forwarding capabilities. IP forwarding capabilities means that network device 130 must be able to receive an IP packet (intended for delivery to a network device other than network device 130) from one of the IP links to which it is connected, and forward the IP packet along at least one of the other IP links to which it is connected. In the general case where network device 130 is a typical router, network device 130 is able to receive and forward IP packets from and to any of the IP links 160, 166, 168 and 176 to which it is connected, provided, of course, that the links are functional. Similarly, the other network devices 125, 135, 140, 145, and 150 with IP forwarding capabilities are able to receive and forward IP packets from and to any of the IP links to which they are connected.

Should network device 110 wish to communication with, for example, network device 115, there are various paths that the communication could take. The most direct path comprises links 166, 176, and 178. However, other paths include the path comprising links 166, 168, 174, 180 and 178, or even the path comprising links 166, 160, 162, 174, 180 and 178. When network device 110 sends out IP packets to network device 115, it does not know which path the packets will take. Network device 110 simply addresses the packets to network device 115 using network device 115's IP number (129.111.110.9 in the example of FIG. 1), and sends the packets out over link 166 toward network device 130. What network device 130 does with the packets after receipt depends upon the configuration of network device 130. For example, network device 130 may be configured to forward any packet received from link 166 along link 176. Alternately, network device 130 may be configured to forward packets along links depending on the destination IP number of the packet. Network device 130 may also be programmed to monitor traffic along each link and to adapt its forwarding scheme to traffic conditions. The manner in which a network device forwards packets depends on the capabilities and configuration of the particular network device.

Thus, even from the simple network illustrated in FIG. 1, it is apparent that network devices that perform IP forwarding should be properly configured for maximum interoperability to ensure that packets are efficiently routed to their intended destination. The configuration of network devices within a network is one aspect of network management. Network devices may be locally managed or remotely (centrally) managed. Local management of a network device may be accomplished using a workstation or terminal directly connected to the network device. Remote management of a network device may be accomplished from remote terminals or workstations that communicate with the network device via the network, if the network device utilizes a protocol that permits remote management. One protocol used for remote management of network devices is Simple Network Management Protocol (SNMP), which provides a set of commands and parameters that allow communication with and configuration of network devices.

Personnel responsible for management of a network are commonly referred to as network managers. Network management software systems provide tools for network managers to facilitate central management of network devices, particularly when the network devices are widely dispersed geographically or quite numerous. To manage a network device, a network manager must know that the network device exists, how it is connected to the network and to other network devices, and what the capabilities of the network device are. In addition to the network device utilizing a protocol that permits remote management, the network management system used by the network manager must be capable of communication with the network device using the correct protocol.

The configuration of large networks changes frequently due to addition, removal and/or replacement of network devices. To effectively manage large networks such that IP packets are routed correctly over the network, the network manager must know when data forwarding network devices are added or removed. One system used to discover network devices with data forwarding capabilities is described in U.S. patent application Ser. No. 10/029,124, filed Dec. 19, 2001, titled "Method and Apparatus for Automatic Discovery of Network Devices with Data Forwarding Capabilities," assigned to the assignee of the present invention and incorporated by reference herein.

Small networks, i.e., those in which the entire network encompasses a handful of network devices in a localized environment, are relatively easy for a network manager to physically inspect or determine when a network device is added or removed. In large, geographically dispersed networks with hundreds of network devices, however, it is impossible for the network manager to perform a first hand inspection to determine the state of the entire network at any given time.

A managed network often encompasses a plurality of subnets. A subnet is a group of network devices belonging to a specific block, or subset, of IP addresses. For example, one type of subnet comprises IP numbers that share the first three octets, as for example 215.223.46.x (where "x" can be any number from 0 to 255). Larger subnets may share only the first two octets (e.g. 215.223.x.y). In addition to subnets, networks may also include individual IP numbers or ranges of IP numbers. A network manager generally knows which subnets are included in the network being managed. However, the network manager will not necessarily know beforehand the IP number of a network device to be added to a network, particularly if the IP number is not within one of the network's known subnets.

In addition to knowing the identity and physical configuration of the network devices themselves, it is also important for the network manager to be able to monitor logical connections between network devices. A logical connection exists between network devices when at least one port of a first network device is configured so that a message sent out through that port would arrive at a known destination (either a network address or a second network device). The destination may be a particular port or interface on another network device, a particular IP address, or a particular subnetwork. One system used to discover logical links between network devices is described in U.S. patent application Ser. No. 10/029,123, filed Dec. 19, 2001, titled "Method and Apparatus for Automatic Discovery of Logical Links between Network Devices," assigned to the assignee of the present invention, and incorporated by reference herein.

Several prior art network management systems provide tools that allow a network manager to gather certain information about network devices within the network. For example, one prior art system allows a network manager to send queries to each possible IP number in a subnet or other range of IP numbers ("IP number polling") to determine whether a network device is associated with that IP number. If a network device is found, it is automatically added to the network management system's database of managed network devices. This prior art network device discovery system thus ascertains newly added network devices, however, it cannot distinguish between network devices with IP forwarding capabilities and those without. Furthermore, it does not discover network devices outside of the range of IP numbers being searched, nor does it allow a network manager to exert control over which of the newly discovered network devices are to be managed by the network management system.

Other prior art network management systems are only capable of creating and configuring network devices (routers) on a per router basis only, nor do they employ an "IP link" concept for configuring both endpoints (router interfaces) at the same time. This limitation is often prone to errors. Many prior art network management applications perform IP link configuration using Command Line Interface (CLI) scripts, which are command driven, text-based user interfaces to a network device. CLI scripts tend to be error prone and are not easy to debug. In addition, prior art applications do not provide an IP link network provisioning which includes the Asynchronous Transfer Mode (ATM) path.

Therefore, what is needed is a method of network management that provides the ability to provision both ends of the IP link at the same time, facilitate the matching of the parameters, and handle the underlying layers through one graphical user interface (GUI).

SUMMARY OF THE INVENTION

An embodiment of the present invention provides a method for network management that allows the configuration of IP links (a pair of interfaces) in one step, via a dedicated graphical user interface (GUI) form, even though the management protocols available at the two end links (routers) may differ, e.g., one router might use Simple Network Management Protocol (SNMP) or some other protocol, while the other might use Command Line Interface (CLI) or another protocol. The method comprises gathering information from the user, validating this information, and then sending this information to the appropriate router(s). In one embodiment, the method enables a user to specify various configurations when provisioning an IP link, for example, the type of IP link (Point-to-Point, Point-to-IP, or Point-to-Subnet), the numbering type (Numbered or Unnumbered), the application type (IP Forwarding, MPLS and IP Forwarding, or MPLS only), and the sub-layer interfaces to be used (Packet Over Sonet, Asynchronous Transfer Mode, GigEthernet, and others). In addition, the method allows the IP link to be associated to existing (already created) router interface(s), or the interfaces can be created as part of the IP link creation process.

When provisioning the IP link as disclosed in the various embodiments herein, all the data is validated to ensure that no errors are introduced that would prevent IP/MPLS connectivity. The method for provisioning of IP links as taught herein includes, but is not limited to, creation of an IP link, deletion of the IP link, and modification of the IP link. The embodied provisioning of IP links creates and/or modifies the router interface on the router(s) in the network, the MPLS attribute on the router(s), and the lower layer connections to achieve connectivity. With the method, the IP link status is associated with the router interfaces used and the network path over which IP traffic is carried.

An advantage of at least one embodiment of the present invention is that end-to-end provisioning of the IP link is possible, even when routers are not physically directly connected, i.e., across a network cloud.

Another advantage of at least one embodiment of the present invention is that provisioning may be accomplished as a one-step activity conducted via a dedicated GUI form.

Another advantage of at least one embodiment of the present invention is that validation of data entered on the dedicated GUI form is provided to avoid incompatible configuration at the ends of the connection, thus reducing routing configuration errors.

A further advantage of at least one embodiment of the present invention is that the method may be applied to network management of networks comprised of equipment from a diverse range of manufacturers to configure IP links in one step, even though the management protocols available at two end routers may be different.

Yet another advantage of at least one embodiment of the present invention is the time savings made possible over current methods which require configuring a router interface on a per router basis.

Other objects, advantages, features and characteristics of the present invention, as well as methods, operation and functions of related elements of structure, and the combinations of parts and economies of manufacture, will become apparent upon consideration of the following description and claims with reference to the accompanying drawings, all of which form a part of the specification, wherein like reference numerals designate corresponding parts in the various figures, and wherein:

DETAILED DESCRIPTION OF THE FIGURES

Figure 3A:
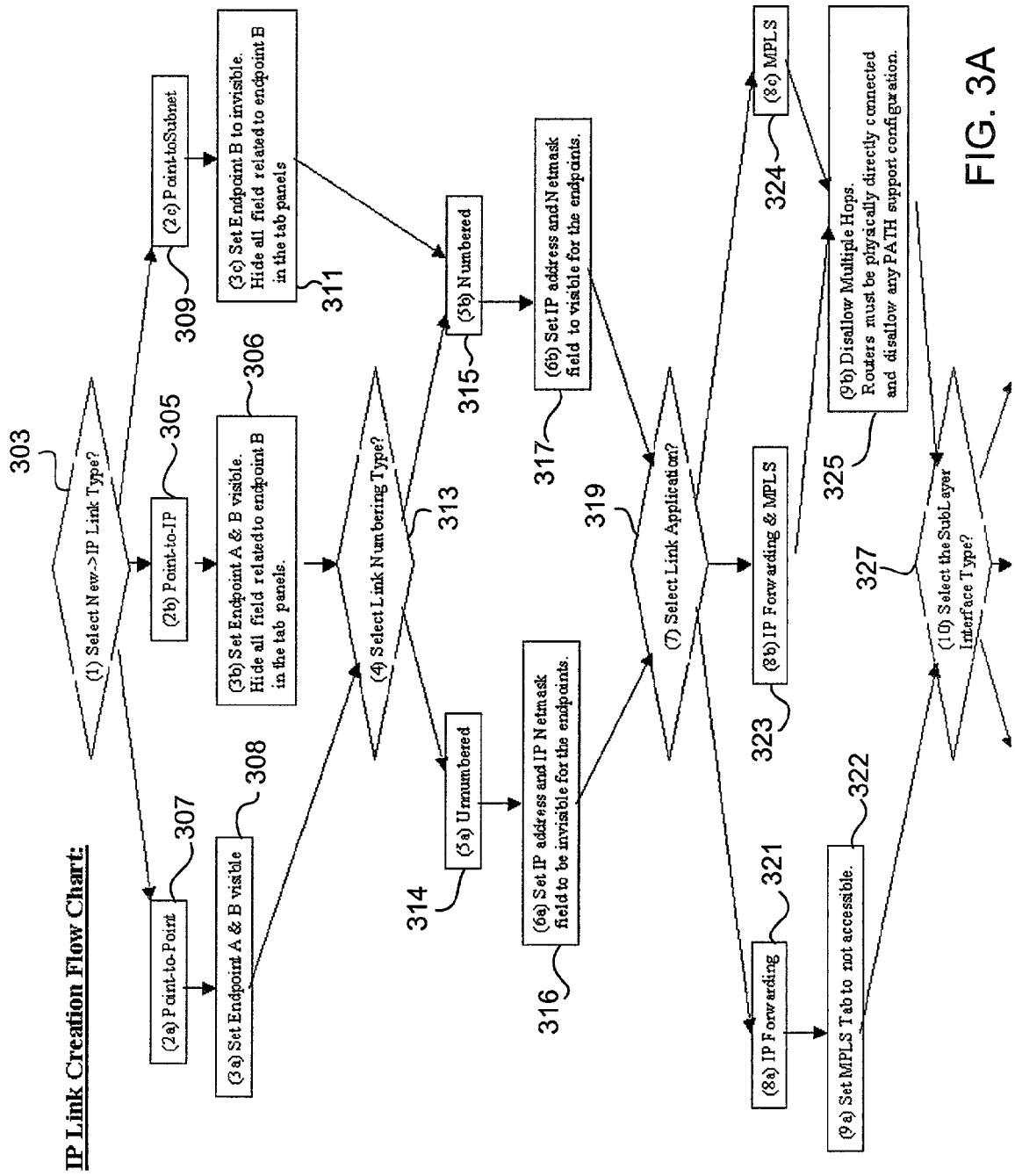
FIG. 3A is a flowchart illustrating a method for providing IP link creation for network management according to at least one embodiment of the present invention.
Figure 3B:
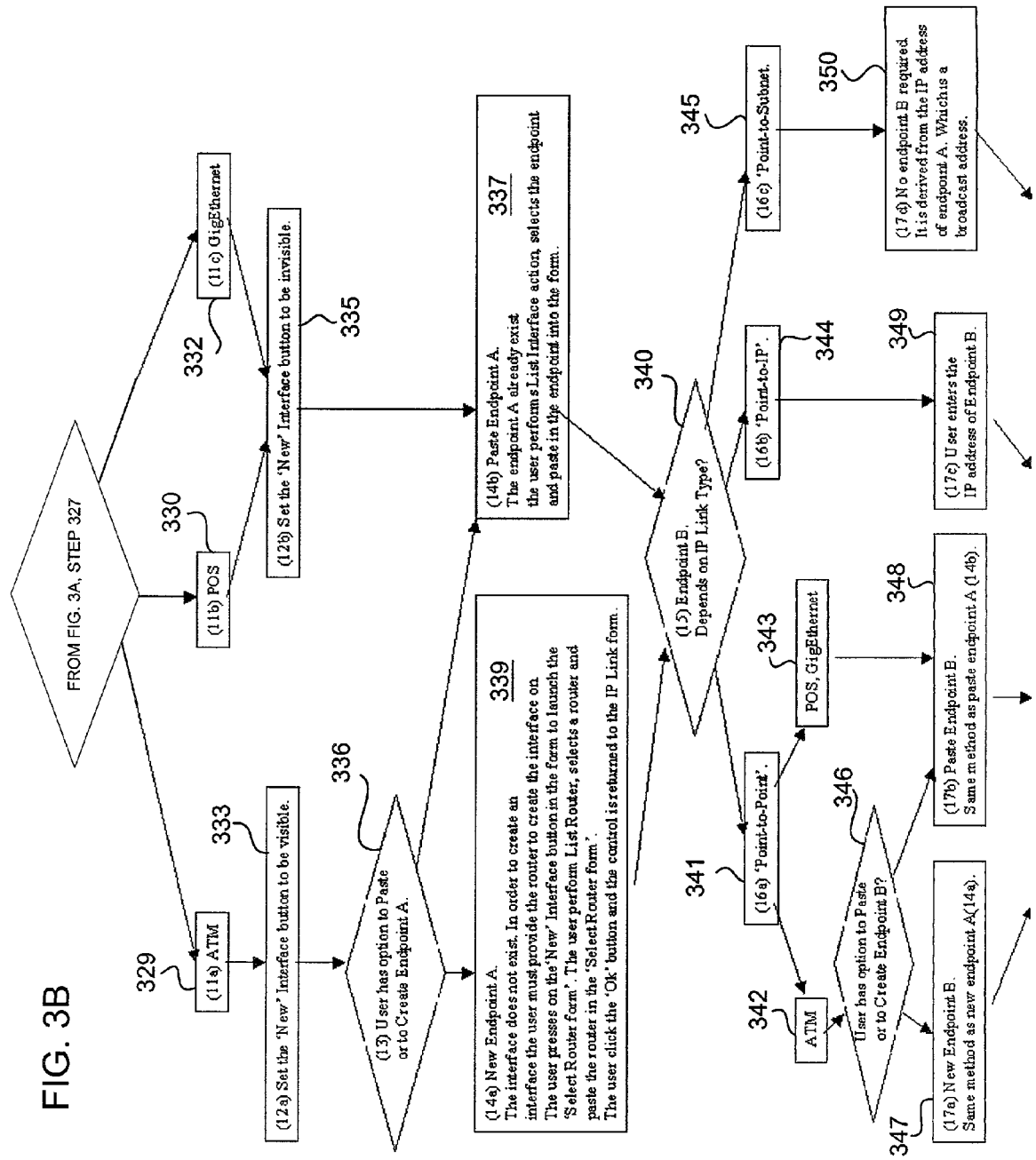
FIG. 3B is a continuation of the flowchart illustrating a method for providing IP link creation for network management according to at least one embodiment of the present invention.
Figure 3C:
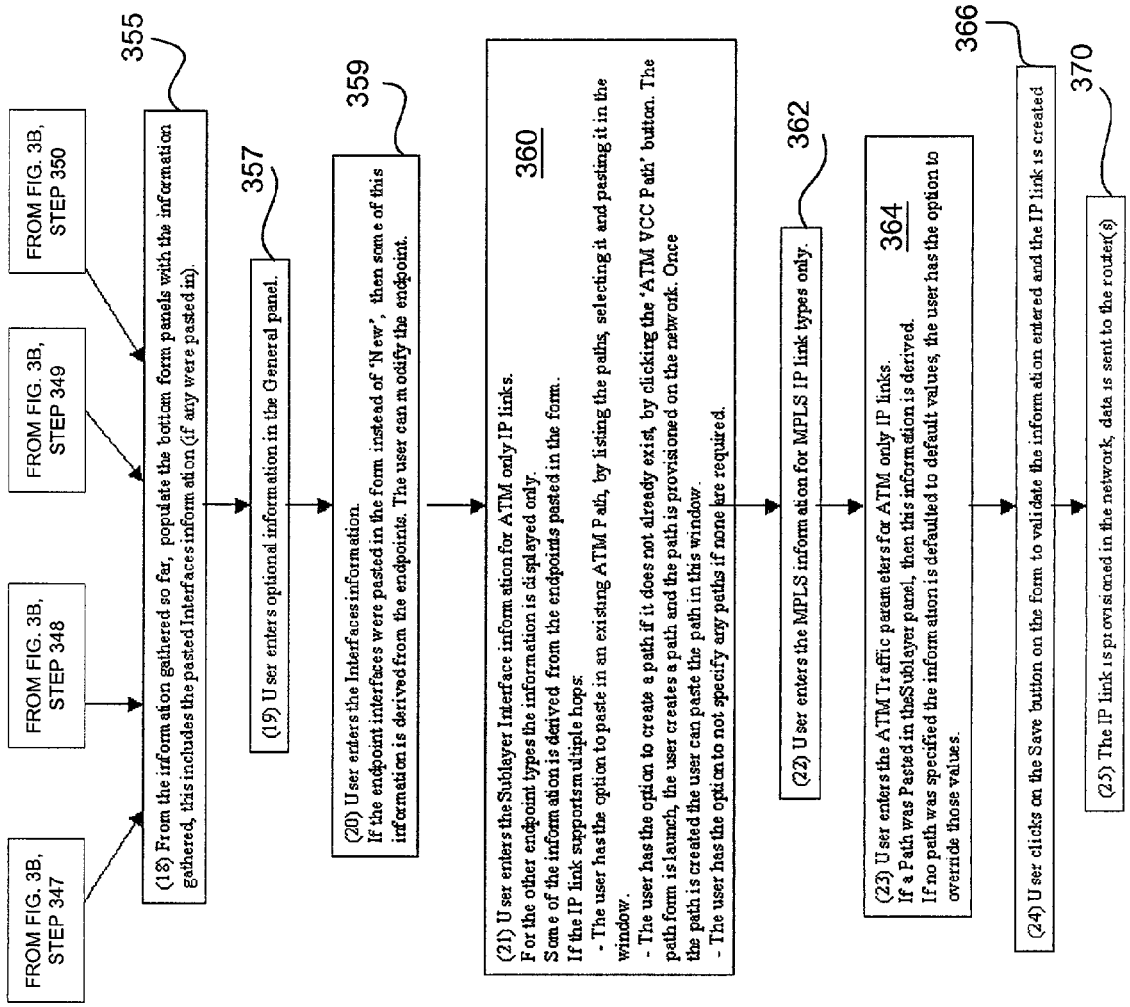
FIG. 3C is a further continuation of the flowchart illustrating a method for providing IP link creation for network management according to at least one embodiment of the present invention.
Figure 4:
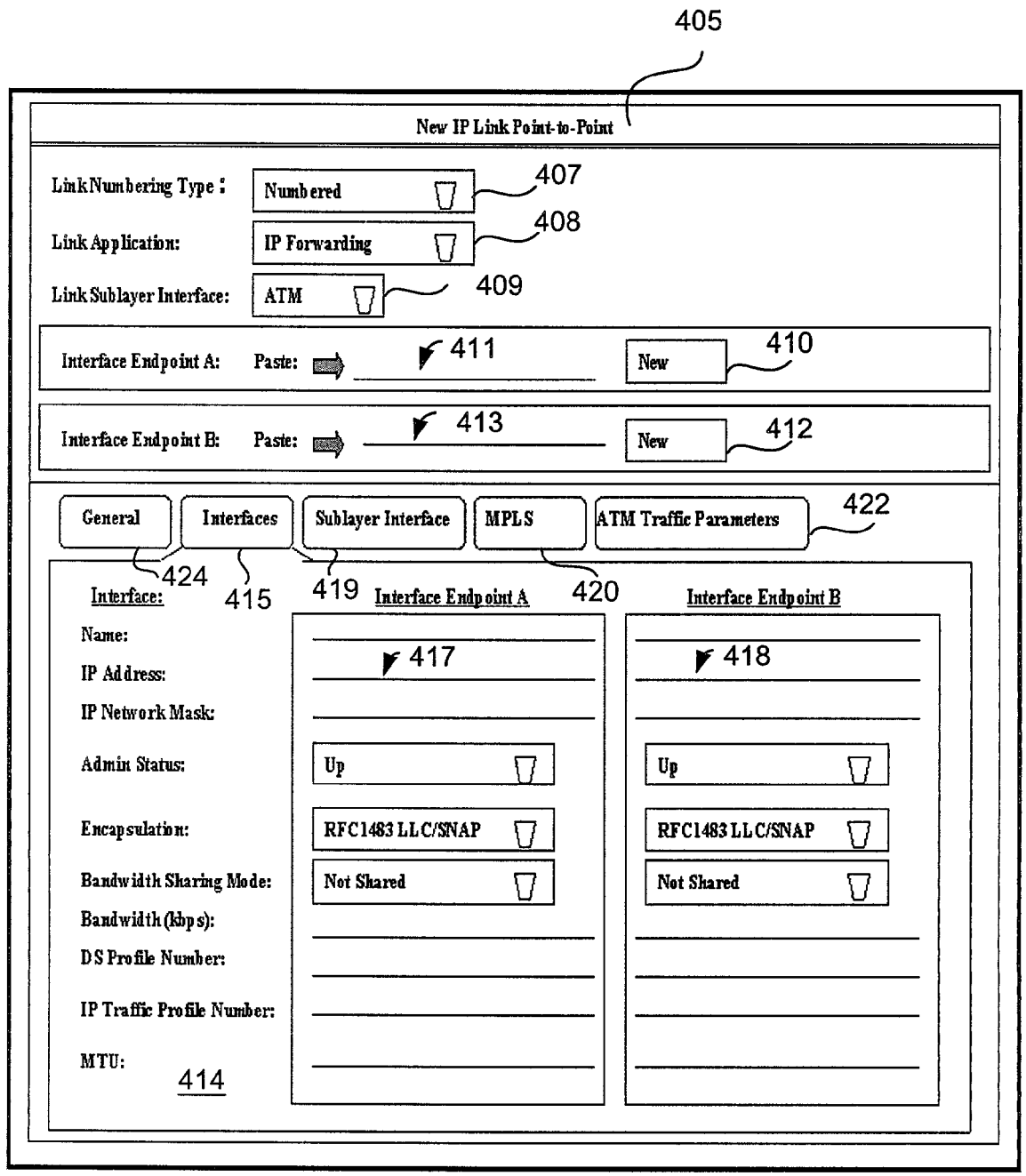
FIG. 4 is an illustration of an example of an IP link provisioning GUI according to at least one embodiment of the present invention.

FIGS. 3A-4 illustrate a method for provisioning IP links. In one or more embodiments, the invention comprises a network and service management system, such as, for example, the Alcatel 5620 Network Management System. In various embodiments, the invention is implemented by means of software programming operating on personal computers, computer workstations and or other computing platforms. In the following description, numerous specific details are set forth to provide a thorough description of the invention. However, it will be apparent to one skilled in the art that the invention may be practiced without these specific details. In other instances, well-known features have not been described in detail so as not to obscure the invention.

FIGS. 3A, 3B, and 3C comprise a flowchart illustrating a method for providing IP link creation for network management according to at least one embodiment of the present invention. The IP link component of the network management system (NMS) as disclosed herein is used to configure a router interface and represent a logical IP connectivity between two routers. When a user configures an IP link of the network management system as disclosed herein, the user can configure the category of the link that identifies whether the IP link is a peer, access, or within network IP link. The endpoint interface configurations of an IP link determine what IP packets are being carried through the IP link, and hence the type of application one may run between the two routers. These applications include IP forwarding, MPLS and IP forwarding, or MPLS. The IP routing protocols (ISIS, BGP, OSPF) can use the IP link to route packets between routers if the link has been enabled with IP forwarding. IP Forwarding IP Link as disclosed herein can run over a NMS Virtual Channel Connection (VCC) path (network cloud) if the IP Link Sub layer type is ATM. The MPLS and IP Forwarding Link is used for enabling MPLS signaling and IP forwarding between two adjacent routers. The MPLS IP Link is used to enable MPLS signaling between two adjacent routers and to disable IP forwarding on some router interfaces where IP forwarding is not supported, but MPLS is supported. The connectivity also helps the NMS user to route LSP (Label Switched Path). The IP link of the disclosed NMS encapsulates the layer 2 (of the OSI Model) complexity, since in practice the logical connectivity is mapped to a one-hop or multiple hops or paths (across a network cloud). The IP link component of the NMS does not configure the routing protocols, however it does configure the MPLS protocol. The network manager (user) configures the other routing protocols using the router Element Management application or CLI (Command Line Interface).

There are various features of the embodied NMS which are valuable to the network manager, for example, the single sided (point-to-IP or point-to-subnet) IP link is useful for configuring only one side of the IP link, representing the other side on the IP Map with the IP address or subnet address and indicating the status of the IP link (or status of the router interface). That is, the user could use the NMS to "see" an IP link representing access to the Internet, or an IP link showing connectivity to an unmanaged router. The term unmanaged router as used herein refers to a router which is not managed by the embodied NMS, and the term managed router as used herein refers to a router which is managed by the embodied NMS.

Referring to FIG. 3A, the first page of the flowchart, the network manager (user) is presented with the option to select a new IP link type to create in step 303. There are three types of IP links that a user may configure: Point-to-Point, Point-to-IP, or Point-to-Subnet. It should be noted that more than one IP link can exist between two routers, however, only one IP link can exist between router interfaces. When the user wants to create a point-to-point link between two routers, if both routers are managed, the user executes step 307 and selects the Point-to-Point IP link type. If one of the routers is not managed by the IP link component of the NMS (network management system) as disclosed herein, the user executes step 305 by selecting the Point-to-IP link type.

Should a user wish to create a "broadcast" interface on a router, the user executes step 309 by selecting the Point-to-Subnet IP type. Interface as used herein refers to an interface on a router, or an (L3) interface, which is an interface with an IP configuration associated with it. In order to forward IP packets, a router interface must be bound to at least one sub layer interface per RFC2233. Note that an interface is created by the action of creating an IP link from the GUI of an embodiment of the present invention, and is visible in an embodiment of the present invention via the "List Interface" window if the router that contains the router interface is managed by the embodied NMS. An interface can be an endpoint of an IP link, and can be created, configured, or deleted as part of the creation/configuration/deletion of an IP link.

For a point-to-point link selection in step 307 for which both routers are managed by the embodied NMS, the router interface for both routers, i.e. with router A at one end and router B at the other end, would be set to be visible to the user in step 308. If a point-to-IP link selection is made in step 305, only one end is managed by the NMS, and although both endpoints would be visible to the user, the fields related to the unmanaged router or router interface would be hidden (from the user) in tab panels of the GUI form, as indicated in step 306. In a point-to-IP link, the IP address would be that of the router or the router interface on the unmanaged router.

For a point-to-subnet link (broadcast interface) selection in step 309, only one router is managed by the NMS, thus endpoint B would be set to invisible, and all fields related to endpoint B would be hidden in tab panels of the GUI form, as seen in step 311. Thus for point-to-subnet, the NMS user would configure the interface at endpoint A only. By "visible," it is meant that a graphical representation of the routers and IP links would be visible to the network manager (user) in a GUI form, while "invisible" means that a graphical representation of a router would not be visible in GUI form. When the user creates an IP link "point-to-subnet," the subnet is created if it doesn't already exist in the NMS database. The subnet address is taken from the router interface configured on the IP link, and the interface IP address must be a broadcast address, i.e., the IP network mask address is not equal to all ones).

When either step 308 or step 306 has been executed, the user selects a link numbering type in step 313. Table 1 indicates the numbering types supported for interfaces, which are created are created whenever an IP link is created with certain embodiments of the present invention.

TABLE 1

Interface Numbering Types Employed by Certain Embodiments of the Present Invention.

| Numbering Type | Descriptions |
| --- | --- |
| Numbered | A) An IP address must be assigned to the interface. The IP address uniquely identifies the router interface (within that VPN domain). The network mask is /30 or /32<br>B) Interface Numbered with Broadcast: An IP address is assigned to the numbered interface, and the IP prefix length is in the range of /0 to /29. This interface is used for broadcasting to a Subnet.. For example an Interface is assigned the following broadcast address:<br>IP address = (138.120.32.2)<br>IP Network Mask = (255.255.255.0)<br>Would result in an interface broadcasting to Subnet: 138.120.32/24 |
| Unnumbered | No IP address is assigned to the interface. |
| Null, Loopback | These Interfaces are not valid IP link endpoints but can be visible by listing this Interface. |

The link numbering selection of step 313 will not occur for point-to-subnet selection 309, as point-to-subnet interfaces must be numbered by default. If "unnumbered" is selected in step 314, the NMS sets the IP address and IP Netmask field to be invisible for the endpoints in step 316. If "numbered" is selected in step 315, the NMS sets the IP address and Netmask field to be visible for the endpoints in step 317. The supported link types for numbered and unnumbered interfaces according to at least one embodiment of the present invention are summarized and presented in Table 2.

TABLE 2

Supported Link Types for Numbered and Unnumbered Interfaces.

| IP Link Type | IP Link Endpoint A | IP Link Endpoint B | Descriptions |
| --- | --- | --- | --- |
| Point-to-Point | Numbered Interface A | Numbered Interface B | Both Interfaces must be Numbered with a network mask of /30 or /32. |
| Point-to-Point | Unnumbered Interface A | Unnumbered Interface B | Both Interfaces must be Unnumbered |
| Point-to-IP | Numbered Interface A | IP address of neighbor Interface | Both Interfaces must be Numbered with a network mask or /30 or /32 |
| Point-to-IP | Interface (Unnumbered) | IP address of neighbor Router | Both Interfaces must be Unnumbered. |
| Point-to-Subnet | Numbered Interface A with network mask of /0 to /29. | Subnet Address (Note 1) | Interface A IP Address must be numbered with a broadcast address. The Subnet address is derived from the interface A IP address. |

Again referring to FIG. 3A, the user selects the link application in step 319. The application options available are IP forwarding in step 321, IP forwarding and MPLS in step 323, or MPLS in step 324. If IP forwarding is selected in step 321, the NMS sets the Multi-Protocol Label Switching (MPLS) tab to not accessible in step 322. For IP forwarding in step 323 and MPLS selection in step 324, the NMS, in step 325, will disallow multiple hops as routers must be physically, directly connected. In addition, in step 325 the NMS will disallow any Path support configuration.

When an IP link is created, if the router interface does not exist, the NMS sub layer interface is used to create the router interface and the IP link. In step 327, the user selects the sub layer interface type. To create an IP link, at least one sub layer interface endpoint (port/channel) is required. The sub layer interfaces supported on routers by certain embodiments of the present invention are shown in Table 3 for the appropriate routers.

TABLE 3

Sub Layer Interfaces Supported on Routers.

| ATM VPI/VCI | POS Un-Channelized | POS Channelized | GigEthernet |
| --- | --- | --- | --- |
| Yes | Yes | Yes | Yes |

From the data of Table 3, it is seen that the user can create an ATM IP link with an endpoint from/to: Router A to Router B. NMS managed router to unmanaged router is supported via "Point-to-IP." Also, the user can create a POS Un-Channelized IP link with an endpoint from/to: Router A to Router B. Further, the user can create a POS IP Link with an endpoint from/to: Router A to a Router B channelized. NMS managed router to unmanaged router is supported via "Point-to-IP." In addition, the user can create POS channelized IP link from/to: Router A to Router B, Router A Un-channelized to Router B. NMS Managed router to unmanaged router via "Point-to-IP." In addition, the user can create a GigEthernet IP link between: Router A to Router B. NMS managed router to unmanaged router is supported via "Point-to-IP" or "Point-to-Subnet."

The sub layer interface types available for the user to enable and which are supported by certain embodiments of the present invention are ATM in step 329, Packet Over Sonet (POS) in step 330, and GigEthernet in step 332, shown in FIG. 3B and Table 3.1. FIG. 3B is a continuation of the flowchart of FIG. 3A. If ATM is selected in step 329, the NMS will set the "New" interface button to be visible on the GUI form, as in step 333. If either POS (step 330) or GigEthernet (step 332) is selected, the NMS system will set the "New" interface button to be invisible in step 335. Once the "New" interface button has been made visible in step 333, the user has the option in step 336 to create endpoint A or to paste an existing (already created) endpoint A. For the step 330 POS and step 332 GigEthernet options, only the paste endpoint option in step 337 would be available, as the "New" interface button was made invisible in step 335. Therefore, if pasting an existing endpoint A were chosen in step 337, the user performs a "List Interface" action from the NMS, selects the existing endpoint, and pastes the selection into the GUI form. Should the user wish to create a new endpoint A in step 336, in step 339 the user would select the "New" interface button on the GUI form, which would launch the "Select Router" form. The user would then perform a "List Router" action, select the router, and paste the selected router into the "Select Router" form. As a final action in step 339, after selecting and pasting the router, the user would click (select) the "Ok" button, and the control is returned to the NMS IP link GUI form.

TABLE 3.1

Link Sublayer Interface Types Supported by Certain Embodiments of the Present Invention.

| IP Link Type | Endpoint A Link Sublayer Interface Type | Endpoint B Link Sublayer Interface Type | IP Link Application |
| --- | --- | --- | --- |
| Point-to-Point | ATM | ATM | IP Forwarding: Single hop supported Multiple hops are supported with the NMS ATM VCC path as option. If a NMS path is included, then both endpoints of the path must be ATM and terminating on the router IP Link endpoints. MPLS & IP Forwarding, MPLS: |

TABLE 3.1-continued

Link Sublayer Interface Types Supported by Certain Embodiments of the Present Invention.

| IP Link Type | Endpoint A Link Sublayer Interface Type | Endpoint B Link Sublayer Interface Type | IP Link Application |
|---|---|---|---|
| Point-to-Point | POS | POS | Single hop supported. When MPLS is enabled on the IP link, then only single hop is supported. NMS ATM VCC Path not supported. IP Forwarding, MPLS & IP Forwarding, MPLS: Single hop supported. Note3 |
| Point-to-Point | GigEthernet | GigEthernet | IP Forwarding, MPLS & IP Forwarding, MPLS: Single hop supported. Note3 |
| Point-to-IP | ATM | Not required (Note1, Note2) | IP Forwarding Single hop supported Multiple hops are supported with the NMS path as options. If a NMS ATM VCC path is included then one of the endpoints of the path must terminate on the endpoint A. The other path endpoint could be of any supported endpoint type (ATM, Frame Relay, etc). MPLS & IP Forwarding, MPLS: Single hop supported. When MPLS is enabled on the IP link then only single hop is supported. NMS ATM VCC path not supported. |
| Point-to-IP | POS | Not required (Note1) | IP Forwarding, MPLS & IP Forwarding, MPLS: Single hop supported. Note3 |
| Point-to-IP | GigEthernet | Not Required (Note1) | IP Forwarding, MPLS & IP Forwarding, MPLS: Single hop supported. Note3 |
| Point-to-Subnet | Any type | Not Required (Note1) | IP Forwarding, MPLS & IP Forwarding, MPLS: Single hop supported and for Broadcast interfaces. |

Note1: For Point-to-IP and Point-to-Subnet the NMS user configures the IP Link Interface at Endpoint A only.
Note2: The IP link interface endpoint B is not required but for the ATM VCC Path it is required. One of the ATM VCC path endpoint must be equal to the IP link endpoint A and the other path endpoint is either a ATM or Frame Relay endpoint not terminating on a router.
Note3: For interface on the Router A (where router A has limitations), only IP Link application "IP Forwarding & MPLS" is supported. IP Forwarding and MPLS cannot be individually turned off.
General Note: In order to provision the multiple-hops, the NMS path form is used. The number of hops used is determined automatically by the NMS Band Width Allocator (BWA).

Again referring to FIG. 3B, in step 340 the choice of endpoint B depends upon the IP link type. For example, for point-to-subnet 345, the NMS user configures the interface at endpoint A only, as the numbered interface A must be numbered with a broadcast address and the subnet address is derived from the interface A IP address. The rules associated with IP link endpoints according to the present disclosure are presented in Table 4.

TABLE 4

IP Link Endpoints Rules.

| IP Link Endpoint A & B Binding | B) Interface (Numbered) | B) Interface (Unnumbered) | B) Subnet | B) IP Address |
|---|---|---|---|---|
| A) Interface (Numbered) | √ Allowed if netmask of endpoint A is /30 or /32 | Not allowed | √ Allowed if netmask of endpoint A is /0 to /29 | √ (this is the IP address of neighbor Interface) Allowed if netmask of endpoint A is /30 or /32. |

TABLE 4-continued

IP Link Endpoints Rules.

| IP Link Endpoint A & B Binding | B) Interface (Numbered) | B) Interface (Unnumbered) | B) Subnet | B) IP Address |
|---|---|---|---|---|
| A) Interface (Unnumbered) | Not allowed | √ | Not allowed | √ (this is the IP address of neighbor Router) |

Thus if the point-to-point IP link type of step 341 applied, both ATM in step 342 and POS-GigEthernet in step 343 could be applicable. For point-to-IP in step 344, the user would enter the IP address of Endpoint B, as in step 349. For point-to-subnet in step 345, no endpoint B is required, as seen in step 350, for reasons previously discussed. Should the POS-GigEthernet of step 343 apply, endpoint B could be pasted in step 348 in the same fashion as was accomplished for endpoint A in step 337. If the ATM of step 342 applied, the user would have the option in step 346 of creating endpoint B, or pasting endpoint B. Should the user choose to create a new endpoint B as in step 347, the procedure would be accomplished in the same fashion as for endpoint A in step 339, or alternately, if the endpoint B already existed, it could be pasted in the same fashion in step 348 as was accomplished in step 337 for endpoint A.

Reference is now made to FIG. 3C, the third page continuation of the flowchart illustrating a method for providing IP link creation for network management according to at least one embodiment of the present invention. Step 355 indicates that the information collected from the user during this session is used to populate the bottom form panels for GUI display. The information includes any pasted interface(s) information, if any were pasted in during the session. The user may choose to enter information into the General panel in step 357, if so desired. In step 359, the user enters the interface information. If the endpoint interfaces were pasted into the form (step 337 and/or step 348) instead of being created ("New"), then some of this information is derived from the endpoints, and the user can choose to modify the endpoint in step 359.

In the case of ATM only IP links, in step 360 the user enters the sub layer interface information. For the other endpoint types, the sub layer interface information is displayed only. Some of the ATM and/or other endpoint sub layer interface information is derived by the NMS from endpoint information previously pasted into the form during the session. If the IP link type supports multiple hops, in step 360 the user has the option of pasting in an existing ATM Path. This action is accomplished by the user selection of path listings, and then selecting the pasting the existing ATM Path into the GUI window. Additionally, the user has the option in step 360 to create a path, if one does not already exist by selecting the "ATM VCC Path" button, which launches the path form. From the path form, the user creates a path, and the path is provisioned on the network. Once the path is created, the user may paste the path in the GUI window. Alternately, the user has the option in step 360 to specify no paths, if no paths are required.

For MPLS IP link types, in step 362 the user would enter the MPLS information. In the case of ATM only IP links, in step 364 the user enters the ATM Traffic parameters. If a Path was pasted in the sub layer panel, then this information is derived by the NMS from the previous action (steps 327 through 339). If no path was specified, the NMS defaults the path information to default values. The user has the option, however, to override the default values.

In step 366, the user clicks on the "Save" button on the form to begin the validation process for creating the IP link. Before anything is saved into the database, all rules and parameter ranges are verified. Nothing will be saved into the database if there is any verification failure, and will result in an error message being popped up stating the problem. In the various embodiments of the present invention, there are rules for validating the creation of an IP link in step 366. These rules are shown in Table 5.

TABLE 5

Rules for Validating the Creation of an IP Link.

1. Verify that the endpoints used by the IP Link are not already used by another IP links.
2. Verify Point-to-Point IP links that two interfaces (Endpoint A and Endpoint B) are provided when the interface exist, or that two Routers & the Sublayer interfaces are provided when the interfaces don't exist (user wishes to create the endpoints).
3. Verify Point-to-IP & Point-to-Subnet links that one interface (Endpoint A) is provided or that one Router & Sublayer interface is provided when the interface don't exist. (user wishes to create the endpoint).
4. Verify Point-to-IP links that the IP address (Endpoint B) is provided. The IP address could be one that already exist or a new IP Address.
5. Verify Point-to-Subnet links that the interfaces (Endpoint A) is provided with an IP address set with a mask of not all one's (for example, 255.255.255.255 is invalid). In other words the IP Address is providing the Subnet network address.
6. Verify that for numbered interfaces, an IP address and Network mask has been specified.
7. Verify that for numbered interfaces, the IP address specified is unique within the network being managed.
8. Verify (Point-to-Point) that the interfaces used by the IP link have the same Sublayer type (ATM, POS, GigEthernet).

TABLE 5-continued

Rules for Validating the Creation of an IP Link.

9. Verify (Point-to-Point) that the interfaces used by the IP link have the same application type (MPLS, IP Forwarding & MPLS, IP Forwarding)
10. Verify (Point-to-Point) that the interfaces used by the IP link have the same MTU.
11. Verify (Point-to-Point) that the interfaces used by the IP link have unique names.
12. Verify (Point-to-Point) that the interfaces used by the IP link have the same Bandwidth.
13. Verify (Point-to-Point) that the ATM interfaces used by the IP link have the same VPI/VCI at each end or is equal to the ATM Path VPI/VCI when a path is used.
14. Verify (Point-to-Point) that the interfaces used by the IP link have the same encapsulation (RFC1483 LCC/SNAP, RFC1483 Null Routed, PPP or Ethernet).
15. Verify (Point-to-Point) that the interfaces used by the MPLS IP link have same MPLS protocol (CR-LDP, RSVP-TE).
16. Verify (Point-to-Point) that the interfaces used by the MPLS IP link have same MPLS Label type (Generic, LC-ATM).
17. Verify (Point-to-Point) MPLS IP link are single hop.
18. Verify that the IP link endpoints matches the ATM Path endpoints when one is provided.
19. Verify (Point-to-Point) that All ATM traffic parameters match for both IP Link endpoints.
20. Verify that for some routers the MPLS link application is only "IP Forwarding & MPLS".
21. Verify that for some routers (compatibility) that the MPLS link uses is RSVP-TE protocol only.
22. Verify that for some routers that only one unnumbered IP link is created to another router. Until the router restriction is removed.
23. Verify that for some routers (restrictions) that they are only one MPLS signalling link per VPI.

Finally, when all the verifications (validations) have passed (step 360), in step 370 the network management system will send the configuration parameters are sent to the node (the network elements involved) via SNMP and saved into the database (if SNMP was successful), and the link status becomes "Link Down." If SNMP was not successful, the user is warned of the error. For some routers, CLI is used to send the information to the router. For CLI configuration the information is saved to the database and then sent down to the node. If the CLI command fails then it will log the error in the NMS ELS (Event Logging System) and the status of the IP link will reflect the failure. Creating the IP link will also create the Interface on the routers if they don't already exist. The Interfaces are created first and then the IP link. If the IP link is not saved and the "Cancel" button is pressed, all the configurations will be lost. The IP Link status is changed to 'Link Down' until both Interface statuses are received from SNMP traps. When both Interfaces are up, the IP link status in the GUI window will change to 'Link Up.'

An IP Link can be created via the embodied NMS GUI manually, by SNMP IP Link trap for some routers, or by the auto-discovery process (per co-pending application Ser. No. 10/029,123, "Method and Apparatus for Automatic Discovery of Logical Links between Network Devices"). An example of an IP link provisioning GUI window according to at least one embodiment of the present invention is shown in FIG. 4, and generally designated example GUI window 400. GUI window 400 typifies what a user would see for provisioning a new point-to-point IP link by opening the New→Link→IP Link→Point-to-Point configuration form (not illustrated). A window title 405 appears at the top of the form to indicate the purpose of the window. The user may select the Link Numbering Type (Numbered or Unnumbered) with Link Numbering Type selection button 407. Link Numbering Type selection button 407 has "Numbered" selected in the example of FIG. 4. The user may also select the Link Application (IP Forwarding, IP Forwarding and MPLS, or MPLS) with the Link Application selection button 408. In the same manner, the Link Sub layer Interface (ATM, POS, GigEthernet) may be selected with the Link Sub Layer Interface selection button 409.

For Interface Endpoint A, the user selects the New button 410 to launch the New Interface window (not illustrated). The New Interface window title is 'New Interface,' and contains only one field, "Router:=>_____". The user must paste the router (to create the interface on) in the New Interface window. The router can be selected via the map feature, the navigator feature, or the list router window (not illustrated). Once the router is selected, the user clicks on the paste button to paste the router in the single field of the New Interface window, and then selects the OK button. The new interface is then created, and automatically filled in the Interface Endpoint A Paste field 411 of GUI provisioning window 400. In a similar manner, for Interface Endpoint B, the user selects the New button 412 to open the new Interface window (not illustrated), pastes router B and selects OK. The selected router is then automatically pasted into the Interface Endpoint B Paste field 413. The user selects the Interfaces panel tab 415 to access the Interface panel 414, and enters the IP address of the two numbered interfaces being created in the respective IP address field areas 417 and 418. The user would then select the Sublayer Interface panel tab 419 to access the Sublayer Interface panel (not illustrated) in order to paste in the "two ATM Port" used by the IP link, and then select the save button. Upon clicking the save button, the IP Forwarding IP link would be created with two new Numbered Interfaces. Other tab panels available in GUI window 400 may include a general tab 424, an MPLS tab 420, and an ATM traffic parameters tab 422. By default, the general configuration tab panel is displayed when the IP link configuration form is opened.

In the various embodiments of the present invention, various fields are available within the various GUI forms. Table 6 indicates the various fields displayed on the New IP Link forms. In Table 6, the following column headings are used to describe the fields in the forms:

Panel Item Label: The name of a field in the form.
Visible: The user can or cannot see the field in the form. "Always" visible means the user can see the field. "Never" visible means the user cannot see the field.
Frozen: The field value is or is not editable. "Always" frozen means this field is not editable. "Never" frozen means this field is editable. The frozen field has the information if the item is configurable during the IP Link Configuration operation (Config Mode: means during IP link configuration)

Default Value: What is the default value for this field value.
Valid Options: What is the valid value that a user can enter in this field.
Affects On Other Fields: If changing the value of this field will affect the other fields.

When creating an IP link up as taught herein, three Objects are created: the two router Interfaces and the IP Link. When paste Interface is selected, the Interface is not created, but is used. When new Interface is selected, then the Interface is created.

TABLE 6

Fields Displayed on the New IP Link Form.

| Panel Item Label | Visible | Frozen | Default Value | Valid Options | Affects On Other Fields/Comment. |
|---|---|---|---|---|---|
| IP Link Type is set when the window is opened. The IP link Type appears in the title of the window. | N/A | N/A | N/A | "Point-to-Point" "Point-to-IP" "Point-to-Subnet" | Select point-to-point if you want a 'point-to-point' IP link and you are managing both routers. Select point-to-IP if you want a 'point-to-point' IP link and you are managing only one router. Select point-to-Subnet if you want to create a broadcast interface. For Point-to-Point the Endpoint A and Endpoint B field become visible with there default For Point-to-IP the endpoint B is the IP address. For Point-to-Subnet the Endpoint B is not visible. |
| Link Connection Type: | Always | Never frozen in New mode. Always frozen in Config mode | 'Numbered'. | "Numbered" "Unnumbered" for Point-to-Point and Point-to-IP. "Numbered" for Point-to-Subnet | Changing this field to "Numbered" will require an IP address and IP network mask to be filled in for the interface(s). Changing this field to Unnumbered will result in the IP address and network mask to be invisible and not required. The user can paste in a unnumbered interface even if this field is set to Numbered. On the save, the interface(s) will be changed to whatever the Link Connection Type is set too. See |
| Link Application | Always | Never frozen in New mode. Always frozen in Config Mode | "IP Forwarding" | "MPLS & IP Forwarding", "IP Forwarding", "MPLS" (will turn ip forwarding off on forwarding interfaces, useful for LSP IP links on non-forwarding cards.) | Select the type of application you want to run over the IP link. "IP Forwarding" is used for forwarding only. "MPLS & IP Forwarding" is used for both. "MPLS" is used only if you are creating a ATM IP link to a 7670 on non-forwarding cards. This option should not be used otherwise. |

TABLE 6-continued

Fields Displayed on the New IP Link Form.

| Panel Item Label | Visible | Frozen | Default Value | Valid Options | Affects On Other Fields/Comment. |
|---|---|---|---|---|---|
| | | | | | When this field is set to "MPLS & IP Forwarding" or "MPLS" the MPLS panel is accessible MPLS only supports single hop so the Path field is frozen. |
| Link Sublayer Interface: | Always | Never frozen in New mode, but toggling between ATM, POS, GigEthernet will result in the fields being reset. Always frozen in Config Mode | "ATM", | ATM POS GigEthernet | Select the Interface type you want. ATM: When this field is set to 'ATM' the user can select New button or Paste for the interface. New is the default. The ATM Traffic Parameter panel is enabled. The Sub Layer Interface path field is available. POS: When this field is set to POS, the user cannot select new interface (the new button are greyed out), only paste interface is available since Interface are created when the card is inserted. The ATM Traffic Parameters panel is frozen. The Sub layer Interface displays the POS parameters. GigEthernet When this field is set to 'GigEthernet' the user cannot select new interface, only paste interface is available. The ATM TP panel is frozen. The Sublayer displays the GigEthernet port. |
| New button for Endpoint A. | Always | Frozen in New mode when Link Sublayer is POS or GigEthernet Never frozen in New mode for ATM. Always frozen in config mode | N/A | N/A | For Endpoint A: When this button is pressed the new Interface window is opened. The user can paste in a router. When the users clicks ok the new Interface is entered in the paste field. The inteface created depends on the IP Link Numbering Type and Sublayer Interface field. The Endpoint A will be created on the save. |
| Paste for Endpoint A | Always | Frozen in New mode when IP link Sub layer is ATM. Never frozen | N/A | A valid Interface from the List Interface window or the new interface | For Endpoint A: The user can paste in a valid interface. The interface must be the same type as the IP Link Sublayer |

TABLE 6-continued

Fields Displayed on the New IP Link Form.

| Panel Item Label | Visible | Frozen | Default Value | Valid Options | Affects On Other Fields/Comment. |
|---|---|---|---|---|---|
| | | in new mdoe for POS or GigEthernet. Always frozen in config mode | | window. | Interface field. Allow the user to paste numbered or unnumbered interface not matching the Connection type since on the save the type will be changed accordingly. The Interface endpoint is of the following format: <RouterName/interface> Example: Toronto/0001 No IP link must exist on the paste in Interface. |
| New for endpoint B | Only visible when the Link Type is Point-to-Point Not visible otherwise. | Frozen in New mode when Link Sublayer is POS or GigEthernet. Never frozen in New mode for ATM. Always frozen in config mode | N/A | N/A | For Endpoint B: When this button is pressed the new Interface window is opened. The user can paste in a router. When the users clicks ok the new Interface is entered in the paste field. The interface created depends on the IP Link Connection Type and Sublayer Interface field. The Endpoint B will be created on the save. |
| Paste for endpoint B | Visible when the Type is Point-to-Point. | Frozen in New mode when IP link Sub layer is ATM. Never frozen in New mode for POS or GigEthernet. Always frozen in config mode | N/A | A valid Interface from the List Interface window or the new interface window. | For Endpoint B: The user can paste in a valid interface. The interface must be the same type as the IP Link Sublayer Interface field. Allow the user to paste numbered or unnumbered interface not matching the Connection type since on the save the type will be changed accordingly. No IP link must exist on the paste in Interface. |
| IP Address Endpoint B: | Only visible when Type is Point-to-IP | Never frozen in New mode. Always frozen in config mode | 0.0.0.0 | Ipv4 | For Endpoint B: For Link Connection Type Numbered the field is the IP address of the neighbor router interface. For Link Connection Type Unnumbered this field is the IP Address of the neighbor Router. (The Router ID of the neighbor router which is an IP address). |

In addition to creating an end-to-end IP link with an embodiment of the present invention, it is possible for a user to delete an Interface with the embodied NMS GUI, as well as the CLI or the EM application. Certain interfaces such as POS and GigEthernet are not deleted on a delete action but actually return to the default configuration, which is an unnumbered interface. The interface is deleted from the disclosed logical link database when any of the following actions occur:

- The user selects the Interface (via the List Interface window) and performs Object→Delete. The interface can only be deleted if no IP Link exists on the interface. If the interface is POS or GigEthernet, then this action is not permitted.
- The user deletes an IP Link by selecting it in the List IP link window and performing Object→Delete.
- The card is deleted, in the case of POS and GigEthernet interfaces.
- The router is reconciled and the Interface is determined to no longer exist.
- The router is deleted. In this case, the Interface is deleted within the logical link database, but is not deleted on the network.
- The SNMP trap is received indicating an Interface was deleted on the node.

When the user deletes an IP Link "Point-to-Subnet," the subnet is deleted if it is the last IP link using the subnet.

Figure 5:
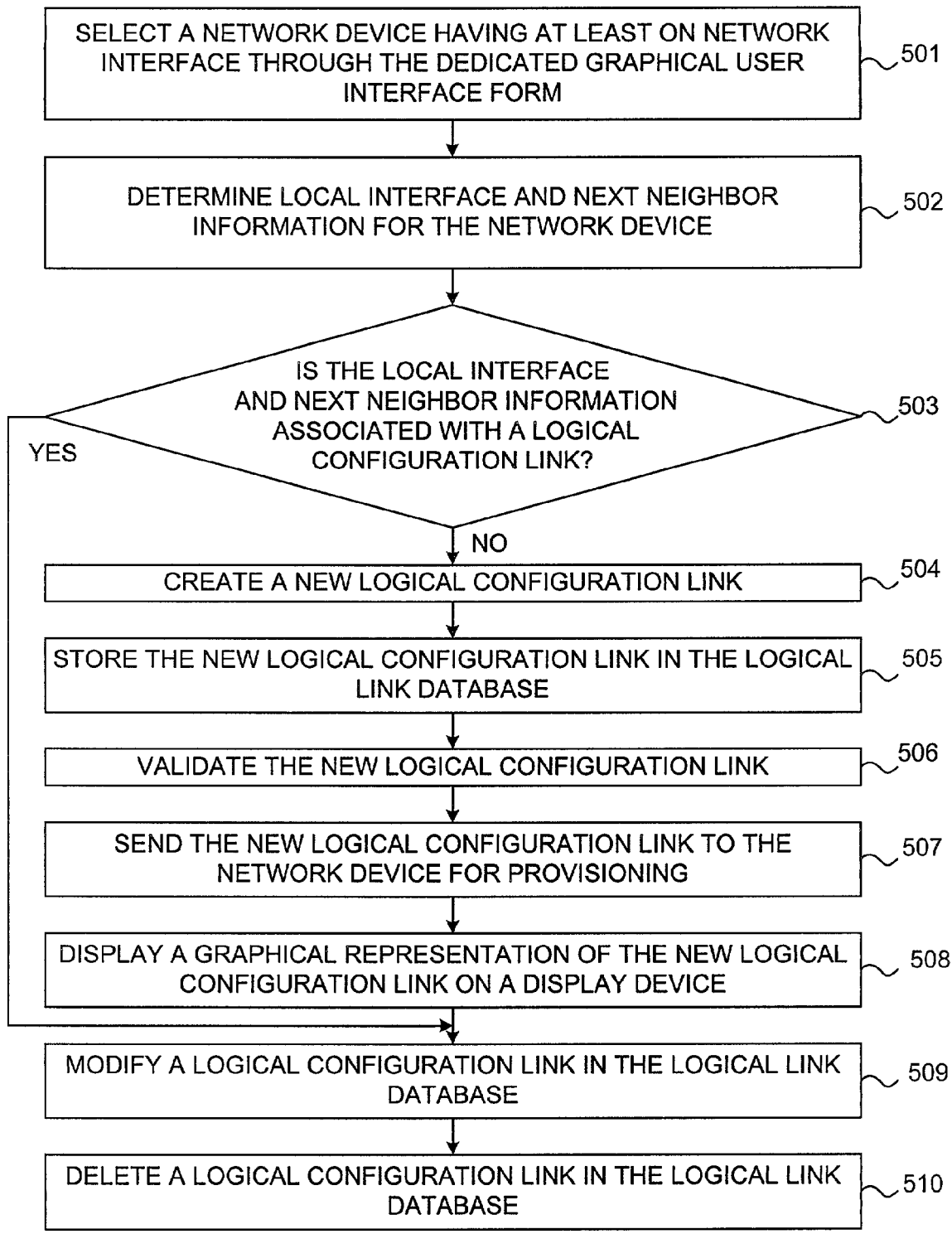
FIG. 5 is a flow diagram illustrating a method for provisioning logical configuration links for network devices in accordance with an embodiment of the invention.

FIG. 5 is a flow diagram illustrating a method for provisioning logical configuration links for network devices in accordance with an embodiment of the invention. The method may be used, for example, for provisioning logical configuration links for at least two network devices through a dedicated graphical user interface form. In step 501, a network device having at least one network interface is selected through the dedicated graphical user interface form. In step 502, local interface and next neighbor information for the network device is determined. In step 503, a determination is made as to whether or not the local interface and next neighbor information is associated with a logical configuration link stored among a plurality of logical configuration links in a logical link database. If so, the process continues at step 509. If not, the process continues at step 504.

In step 504, a new logical configuration link is created. In step 505, the new logical configuration link is stored in the logical link database. In step 506, the new logical configuration link is validated. In step 507, the new logical configuration link is sent to the network device. In step 508, a graphical representation of the new logical configuration link is displayed on a display device.

In step 509, a logical configuration link in the logical link database is modified. In step 510, a logical configuration link in the logical database is deleted.

Figure 6:
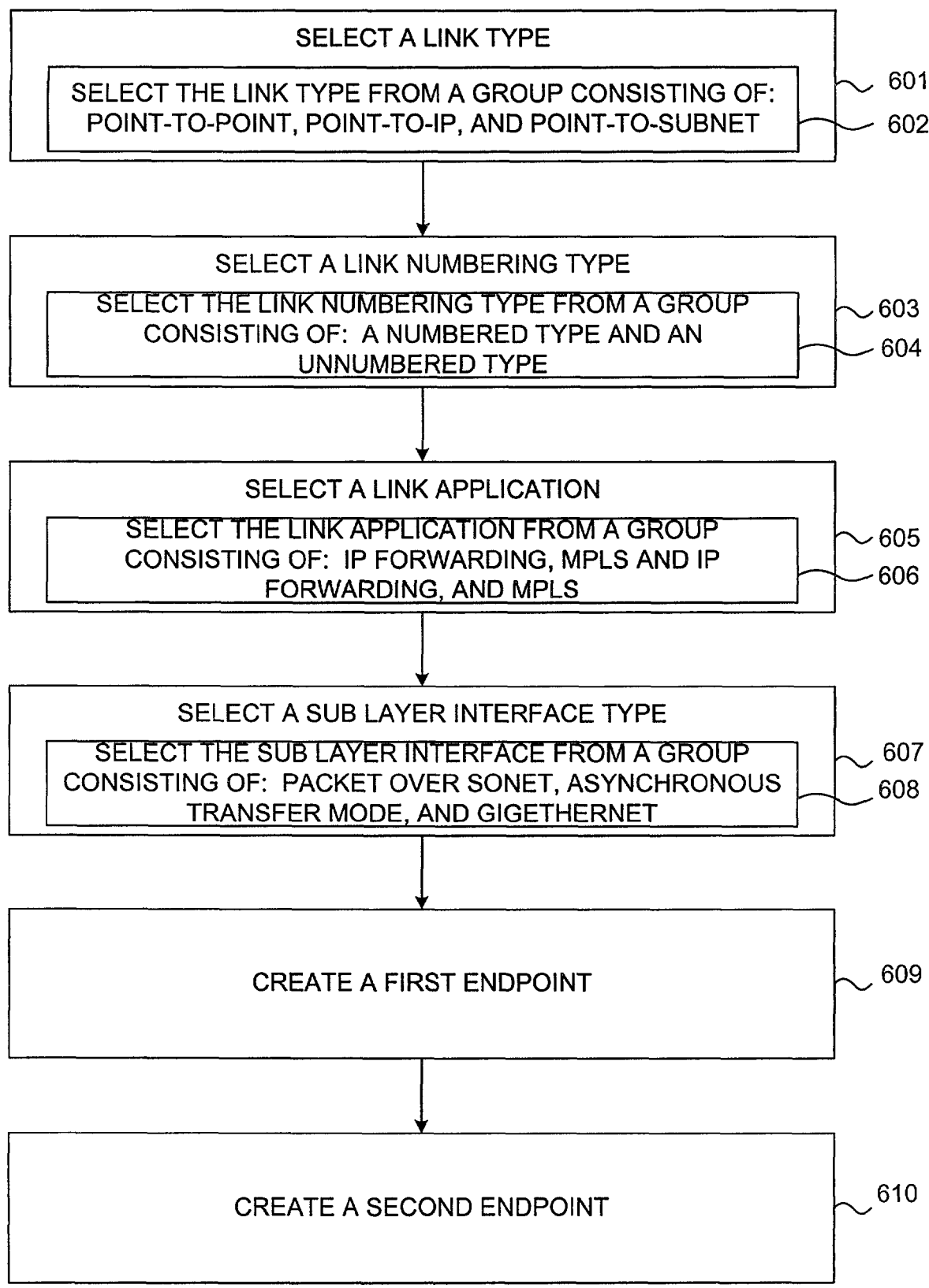
FIG. 6 is a flow diagram illustrating a process for creating a new logical configuration link in accordance with an embodiment of the present invention.

FIG. 6 is a flow diagram illustrating a process for creating a new logical configuration link in accordance with an embodiment of the present invention. As an example, step 504 of FIG. 5 may comprise one or more of the steps illustrated in FIG. 6. In step 601, a link type is selected. Step 601 may comprise step 602. In step 602, the link type is selected from among a group consisting of: point-to-point, point-to-IP, and point-to-subnet. In step 603, a link numbering type is selected for the new logical configuration link. Step 603 may comprise step 604. In step 604, the link numbering type is selected from a group consisting of: a numbered type and an unnumbered type. In step 605, a link application is selected for the new logical configuration link. Step 605 may comprise step 606. In step 606, the link application is selected from a group consisting of: Internet Protocol Forwarding, Multi-Protocol Label Switching and Internet Protocol Forwarding, or Multi-Protocol Label Switching. In step 607, a sub layer interface type is selected. Step 607 may comprise step 608. In step 608, the sub layer interface type is selected from a group consisting of: Packet Over Sonet, Asynchronous Transfer Mode, and GigEthernet. In step 609, a first endpoint is created for the new logical configuration link. In step 610, a second endpoint is created for the new logical configuration link.

Figure 1:
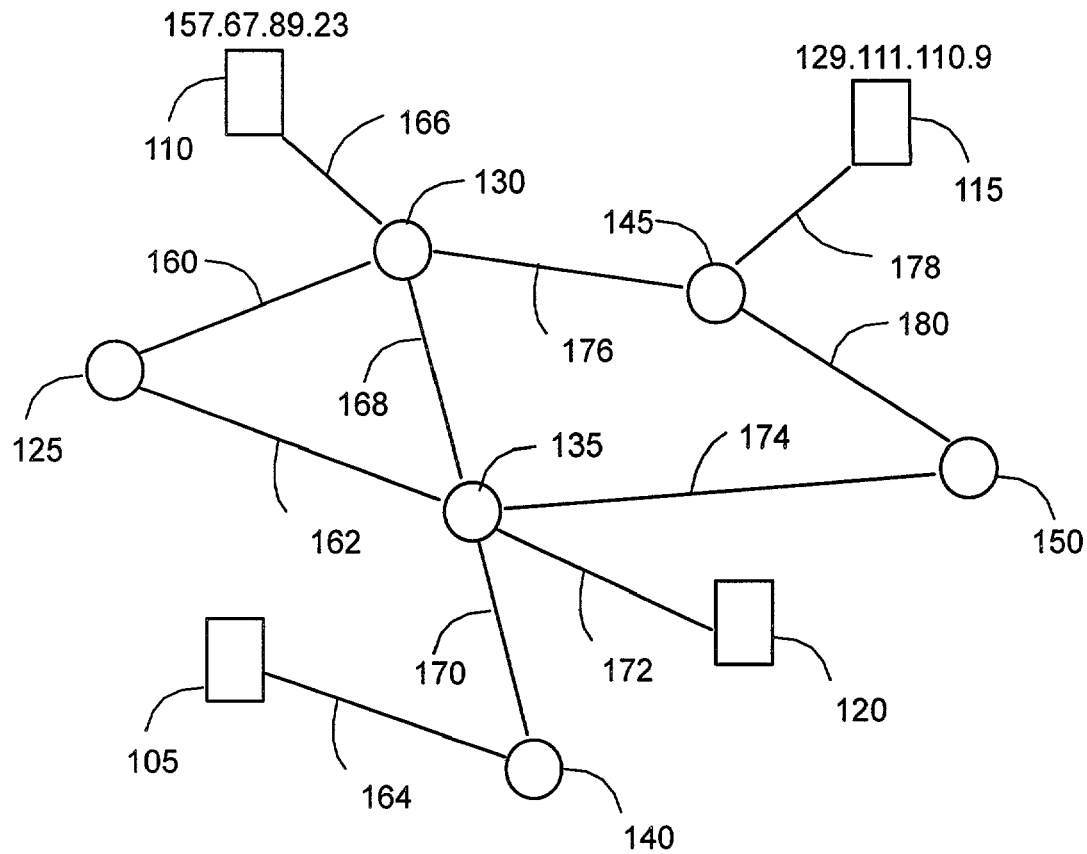
FIG. 1 is a schematic of a data communications network that utilizes data forwarding and logical links.
Figure 2:
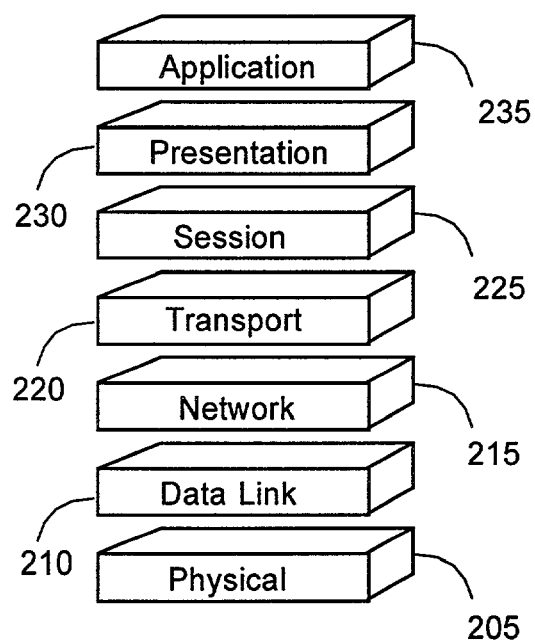
FIG. 2 is a diagram of the Open Systems Interconnect (OSI) Reference Model developed by the International Standards Organization (ISO) generally used to describe the structure and function of data communications protocols.
Figure 7:
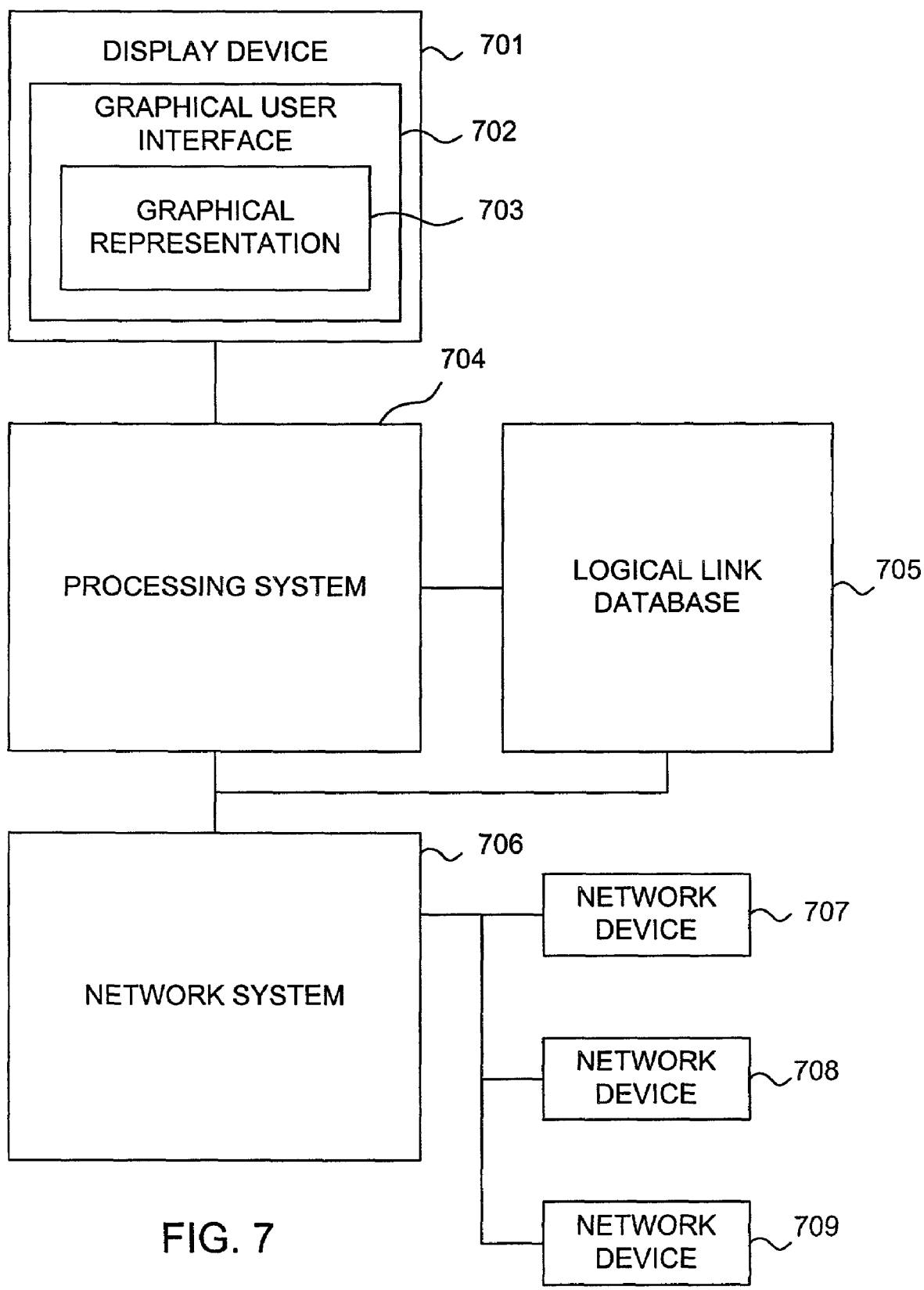
FIG. 7 is a block diagram illustrating apparatus for provisioning logical configuration links in accordance with an embodiment of the present invention.

FIG. 7 is a block diagram illustrating apparatus for provisioning logical configuration links in accordance with an embodiment of the present invention. Display device 701 comprises graphical user interface 702. Graphical user interface 702 comprises graphical representation 703. Display device 701 is coupled to processing system 704. Processing system 704 is coupled to logical link database 705. Processing system 704 and logical link database 705 are coupled to network system 706. Network system 706 is coupled to network devices 707, 708, and 709. The illustrated couplings serve as an example; various elements may be coupled in various ways. Also, the illustrated elements may represent more complex configurations of components. For example, network devices 707-709 and/or network system 706 may include more complex configurations, such as that illustrated in FIG. 1.

Logical link database 705 stores logical configuration links. Processing system 704 accesses the logical link database 705. Display device 701 provides the ability to select a network device having at least one network interface through graphical user interface 702. Processing system 704 determines local interface and next neighbor information for a network device, such as a network device 707-709 selected through graphical user interface 702. Processing system 704 determines whether the local interface and next neighbor information is associated with one of the logical configuration links stored in the logical link database 705. When the local interface and next neighbor information is not associated with any of the logical configuration links stored in the logical link database, processing system 704 creates a new logical configuration link.

Processing system 704 causes the new logical configuration link to be stored in the logical link database 705. Processing system 704 validates the new logical configuration link. Processing system 704 causes the new logical configuration link to be sent to the network device 707-709 to which it corresponds.

The various functions and components in the present application may be implemented using an information-handling machine such as a data processor, or a plurality of processing devices. Such a data processor may be a microprocessor, microcontroller, microcomputer, digital signal processor, state machine, logic circuitry, and/or any device that manipulates digital information based on operational instruction, or in a predefined manner. Generally, the various functions, and systems represented by block diagrams are readily implemented by one of ordinary skill in the art using one or more of the implementation techniques listed herein.

When a data processor for issuing instructions is used, the instruction may be stored in memory. Such a memory may be a single memory device or a plurality of memory devices. Such a memory device may be a read-only memory device, random access memory device, magnetic tape memory, floppy disk memory, hard drive memory, external tape, and/or any device that stores digital information. Note that when the data processor implements one or more of its functions via a state machine or logic circuitry, the memory storing the corresponding instructions may be embedded within the circuitry that includes a state machine and/or logic circuitry, or it may be unnecessary because the function is performed using combinational logic.

The method and apparatus herein provides for a flexible implementation. Although the invention has been described using certain specific examples, it will be apparent to those skilled in the art that the invention is not limited to these few examples. For example, the disclosure is discussed herein primarily with regard to provisioning network devices having IP and MPLS forwarding capabilities, the invention is applicable to network devices having forwarding capabilities using other protocols as well. Additionally, various types of routers and line cards are currently available which could be suitable for use in employing the method as taught herein. Note also, that although an embodiment of the present invention has been shown and described in detail herein, along with certain variants thereof, many other varied embodiments that incorporate the teachings of the invention may be easily constructed by those skilled in the art. Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A network administration method for provisioning logical configuration links for at least two network devices through a dedicated graphical user interface form, the method comprising:
    selecting a network device having at least one network interface through the dedicated graphical user interface form;
    determining local interface and next neighbor information for the network device;
    determining whether the local interface and next neighbor information is associated with a logical configuration link stored among a plurality of logical configuration links in a logical link database;
    creating a new logical configuration link when the local interface and next neighbor information is not associated with any of the logical configuration links in the logical link database;
    storing the new logical configuration link in the logical link database;
    validating the new logical configuration link;
    sending the new logical configuration link to the network device; and
    displaying a graphical representation of the new logical configuration link on a display device, wherein the step of creating the new logical configuration link further comprises the steps of:
    selecting a link type;
    selecting a link numbering type for the new logical configuration link;
    selecting a link application for the new logical configuration link;
    selecting a sub layer interface type for the new logical configuration link;
    creating a first endpoint for the new logical configuration link; and
    creating a second endpoint for the new logical configuration link, wherein the step of selecting the link application further comprises the step of:
        selecting the link application from a group consisting of: Internet Protocol Forwarding, Multi-Protocol Label Switching and Internet Protocol Forwarding, and Multi-Protocol Label Switching.

2. The method of claim 1, wherein the step of selecting the link type further comprises the step of:
    selecting the link type from among a group consisting of: point-to-point, point-to-IP, and point-to-subnet.

3. The method of claim 1, wherein the step of selecting a link numbering type further comprises the step of:
    selecting the link numbering type from a group consisting of: a numbered type and an unnumbered type.

4. The method of claim 1, wherein the step of selecting a sub layer interface type further comprises the step of:
    selecting the sub layer interface type from a group consisting of: Packet Over Sonet, Asynchronous Transfer Mode, and GigEthernet.

5. The method of claim 1, further comprising the step of:
    modifying a logical configuration link in the logical link database.

6. The method of claim 1, further comprising the step of:
    deleting a logical configuration link in the logical link database.

7. The method of claim 1 wherein creating the new logical configuration link when the local interface and next neighbor information is not associated with any of the logical configuration links in the logical link database occurs based on interfaces information entered by a user.

8. Apparatus for provisioning logical configuration links comprising:
    a logical link database for storing logical configuration links;
    a processing system coupled to the logical link database for accessing the logical link database; and
    a display device coupled to the processing system for displaying a graphical user interface form comprising a graphical representation of a logical configuration link, wherein the processing system creates a new logical configuration link when the local interface and next neighbor information is not associated with any of the logical configuration links stored in the logical link database, wherein the processing system creates the new logical configuration link by selecting a link type, selecting a link numbering type for the new logical configuration link, selecting a link application for the new logical configuration link, selecting a sub layer interface type for the new logical configuration link, creating a first endpoint for the new logical configuration link, and creating a second endpoint for the new logical configuration link, wherein the processing system selects the link application by selecting the link application from a group consisting of: Internet Protocol Forwarding, Multi-Protocol Label Switching and Internet Protocol Forwarding, and Multi-Protocol Label Switching.

9. The apparatus of claim 8 wherein the display device provides an ability to select a network device having at least one network interface through the graphical user interface form.

10. The apparatus of claim 8 wherein the processing system determines local interface and next neighbor information for the network device.

11. The apparatus of claim 10 wherein the processing system determines whether the local interface and next neighbor information is associated with one of the logical configuration links stored in the logical link database.

12. The apparatus of claim 8 wherein the processing system causes the new logical configuration link to be stored in the logical link database.

13. The apparatus of claim 12 wherein the processing system validates the new logical configuration link.

14. The apparatus of claim 13 wherein the processing system causes the new logical configuration link to be sent to the network device.

15. A method tied to apparatus for provisioning logical configuration links comprising:
- selecting a link type;
- selecting a link numbering type;
- selecting a link application;
- selecting a sub layer interface type;
- creating a first endpoint;
- creating a second endpoint;
- populating form panels with the link type, the link numbering type, the link application, and the sub layer interface type;
- receiving user input of interfaces information;
- validating the interfaces information;
- creating a link in accordance with the interfaces information;
- provisioning the link; and
- displaying on a display device a graphical user interface form comprising a graphical representation of the link, wherein the step of selecting the link application further comprises the step of:
  - selecting the link application from a group consisting of: Internet Protocol Forwarding, Multi-Protocol Label Switching and Internet Protocol Forwarding, and Multi-Protocol Label Switching.

* * * * *